June 29, 1971　　　　M. T. RUSSO　　　　3,588,959
APPARATUS FOR MOLDING PLASTIC LINK CHAIN
Filed Feb. 19, 1969　　　　2 Sheets-Sheet 1

INVENTOR
MICHAEL T. RUSSO

ATTORNEYS

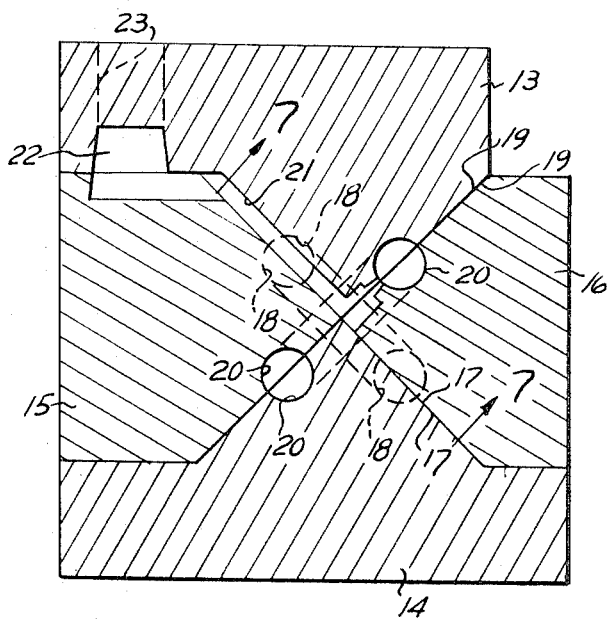
FIG. 6
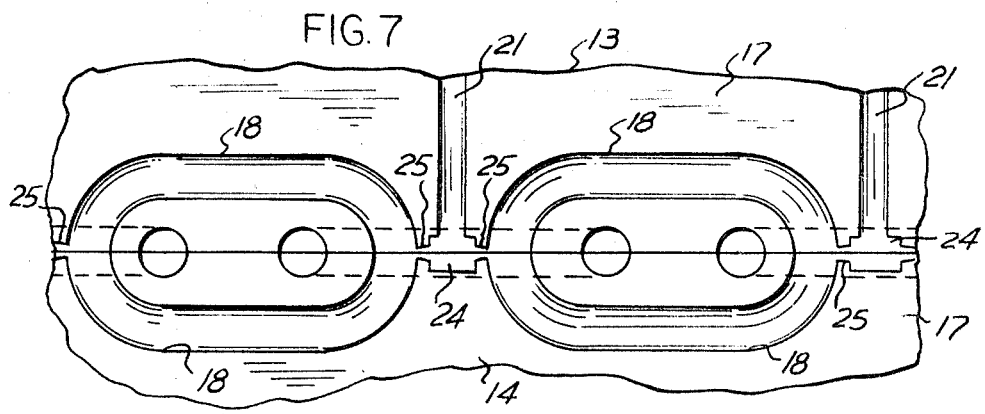
FIG. 7
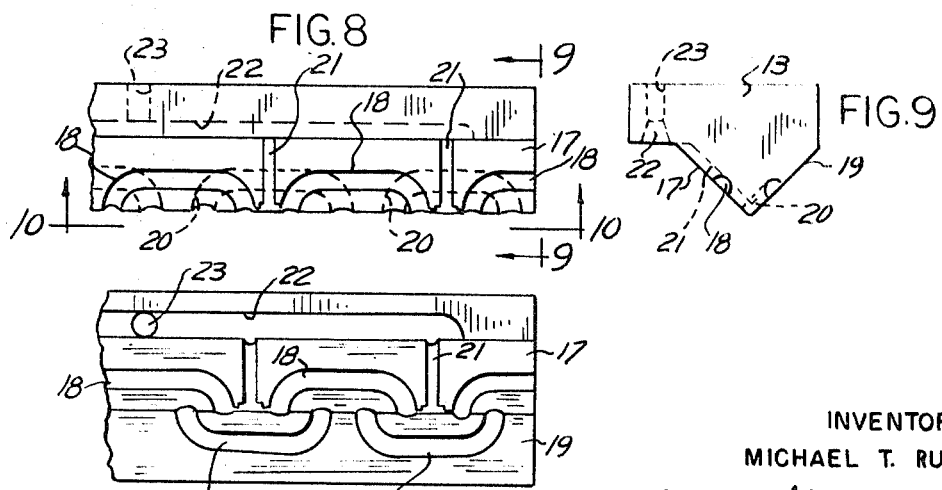
FIG. 8
FIG. 9
FIG. 10
INVENTOR
MICHAEL T. RUSSO

United States Patent Office 3,588,959
Patented June 29, 1971

3,588,959
APPARATUS FOR MOLDING PLASTIC LINK CHAIN
Michael T. Russo, Bloomfield Hills, Mich.
(1805 Larchwood St., Troy, Mich. 48084)
Filed Feb. 19, 1969, Ser. No. 800,449
Int. Cl. B29c 1/00
U.S. Cl. 18—42D
1 Claim

ABSTRACT OF THE DISCLOSURE

A method and mold for molding a length of interconnected chain links using four V-shaped mold quarter sections arranged to fit together face to face to form a closed mold, each section face formed with a quarter portion of link cavities, to form complete link cavities arranged in two rows in perpendicular planes, within the closed mold. The link cavities are so spaced as to closely space the adjacent ends of pairs of links in one plane to the center of the joining link in the other plane, with a molten plastic feed channel extending into such space and branching out into the two link ends and the link center and connected thereto by narrowed neck portions, so that after the links are molded and cooled in the closed mold, and the mold sections are opened, a physical pull upon one end of the chain breaks the feed neck portions simultaneously freeing the links.

BACKGROUND OF INVENTION

Prior link chains formed of metal conventionally were made of metal rod, bent around to form each link, with the abutting ends welded or similarly joined together so that link by link, the chain was assembled. More recently, attempts have been made to form link chains out of plastic materials following the same technique.

Since plastic may be easily molded, attempts have been made to mold plastic link chains in long sections which may be later joined together or added to sections during the molding process. In molding plastic link chains, a problem that has arisen is that the feed channels, through which the molten plastic is fed into the link cavities, must be cut away from or otherwise physically removed from each link. This necessitates considerable labor, thereby increasing the costs of such types of chains, frequently to the point where they are not economical to produce and sell.

Thus, there is a need for some method and equipment for molding link chains out of plastic, but wherein the feed channels may be removed from the links and the links freed relative to the mold and to physical connection to each other, simply and quickly and economically.

SUMMARY OF INVENTION

The invention herein is concerned with a method and a mold for molding long sections of link chains out of plastic materials, including provisions for rapidly and economically breaking the chain away from the feed portions of the mold without need for further physical trimming or cutting away of sprue or feed sections.

More specifically, the invention contemplates a mold made of four quarters, each V-shaped in cross-section, arranged to interfit to form a closed 360° mold having two rows of link cavities, arranged in perpendicular planes, for interengaging links formed in the cavities. The cavities are so arranged that at least each alternate pair of links in one row are spaced closely to each other and to the center of the interconnecting link of the other row and the moten plastic feed is arranged to enter into that space and connect to the three links with narrowed feed neck channels. Hence, upon molding of the links and opening of the mold, a simple pull on the end of the chain will not only remove the chain from the mold, but simultaneously break the links free of the feed at the breakable necks formed in the neck channels and eliminate any further trimming or physical cutting away of the feed portions.

These and other objects and advantages of this invention will become apparent upon reading the following description, of which the attached drawings form a part.

DESCRIPTION OF THE DRAWINGS

FIG. 6 is a cross-sectional end view of the mold, with the mold sections closed.

FIG. 7 is a fragmentary view of the interior of the mold, taken in the direction of arrows 7—7 of FIG. 6.

FIG. 8 is an elevational view of an end portion of the upper mold section, and

FIG. 9 is an end view, taken in the direction of arrows 9—9 of FIG. 8.

FIG. 10 is a bottom view, taken in the direction of arrows 10—10 of FIG. 8.

DETAILED DESCRIPTION

Figure 1:
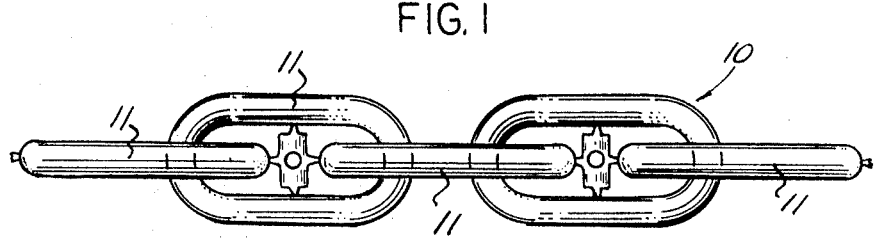
FIG. 1 is a plan view of a short length of link chain, showing the feed portions interconnected with the links.
Figure 2:
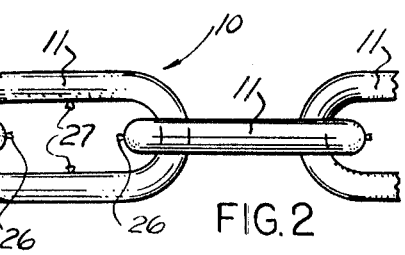
FIG. 2 is a view similar to FIG. 1, but showing the links broken free from the feed portions of the mold.
Figure 3:
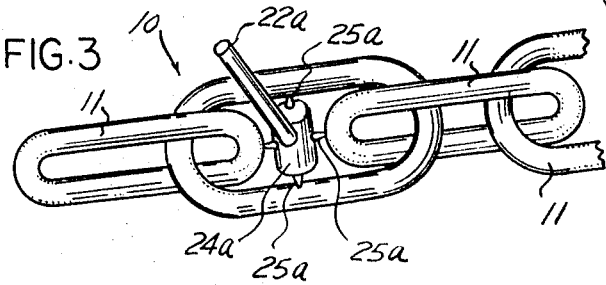
FIG. 3 is a view similar to FIG. 1, but showing a section of chain in perspective.

FIGS. 1–3 illustrate a short section of a link chain 10 formed out of molded plastic, elongated links 11, forming what appears to be a conventional link chain.

Figure 5:
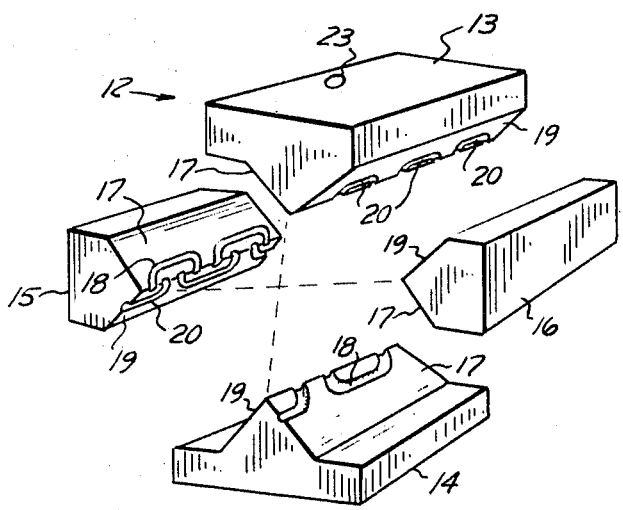
FIG. 5 is a perspective view of a portion of the mold, with the parts opened.

The mold 12 within which the chain is formed, as shown in FIG. 5, comprises four V-shaped quarter sections, namely, upper quarter 13, lower quarter 14, and side quarters 15 and 16. Each mold section has a mold face 17 with a row of one quarter link cavities 18 formed therein. That is each cavity represents one-half of the loop or oval making up the link and one-half of the thickness of that portion of the link.

Each mold also has an opposite face 19 likewise formed with a row of one quarter link cavities 20.

For molding the four sections are arranged together in face to face alignment as indicated in FIG. 6, so that two generally perpendicular interengaged rows of links are simultaneously formed.

In order to feed molten plastic into the link cavities, a feed channel 21 is provided, at least in the upper mold section 13, between each alternate pair of links in one row. The feed channels are connected by a feed supply trough 22, see FIG. 6, into which a feed sprue 23 opens. Thus, molten plastic may be injection forced into the sprue and through the trough and thereby into the feed channel 21 for feeding into the cavities.

Each feed channel 21 terminates in a feed junction 24 which branches out through narrowed feed neck tunnels 25 into the adjacent links.

The adjacent pairs of links are closely spaced together and at the center of the interconnecting link in the opposite row so that the narrowed feed neck tunnels 25 are short and being narrowed, permit the flow of molten plastic under pressure but result in a thin section interconnection with the feed channel.

METHOD OF MOLDING

For molding a length of link chain, the mold is first prepared as shown in the drawings and as described above, with the mold being of some considerable length, such as approximately two feet. The mold sections are closed together, as shown in FIG. 6 and then molten plastic is injected through the sprue 23, the feed supply trough 22 and into the feed channels 21 to the feed junctions 24 and through the narrowed feed neck tunnels 25 into the individual link cavities. Once the cavities are filled with the molten plastic, the entire mold is chilled to solidify the plastic.

Thereafter, the quarter sections are opened. Normally, the molded chain would then appear as shown in FIGS. 1 and 3, namely with a solidified plastic feed portion 22a, a solidified feed junction portion 24a, and solidified short neck portions 25a. Normally, the chain as so shown would be engaged with at least one of the quarter sections of the mold.

At this point, the free end of the chain is grasped, such as by physically grasping it with the operator's hand, and physically pulled to thereby jerk it out of the mold section.

Figure 4:
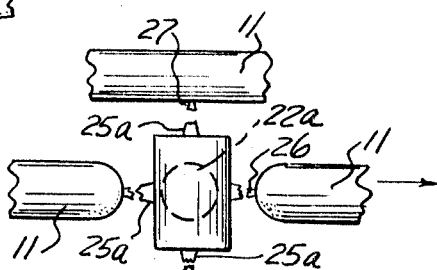
FIG. 4 is a fragmentary, enlarged view showing the breaking away of the feed portions from the links.

This physical pull simultaneously breaks the short neck portions 25a, as illustrated in FIG. 4, to thereby disengage the links from the solidified feed portions and from physical interconnection with each other, leaving short and almost non-visible stubs 26 and 27 at the ends and centers of the respective links. The stubs are enlarged in FIGS. 2 and 4, for illustrative purposes. By tapering the tunnels 25, and thus the neck portions 25a, the break occurs close to or at the junction between neck portions 25a and the link bodies.

In this manner, the links are swiftly, without physical trimming or cutting disengaged from the mold feed portions and physically disconnected from each other so that they are now loosely interengaged, all without the need of care or labor time.

The plastic molded link chain may be formed of any suitable moldable plastic, depending upon the size and strength desired of the chain. By the selection of suitable plastic materials, the chain may be made to be as strong as conventional metal link chains or alternatively may be made of an inexpensive material to form a decorative chain with no real physical strength. By using a sufficiently long mold, a relatively long section of chain may be formed at one time and thereafter the next section may be formed and integrally engaged therewith simply by placing the last or free link into the last mold cavity so that the next section is molded directly to the already completed section. In this way, an endless chain may be formed simply by molding it section by section and advancing each section as it is completed.

Having fully described an operative embodiment of this invention, I now claim:

1. In a mold for molding a length of plastic chain formed of interengaged chain links, comprising four elongated, V-shaped in cross-section, mold quarters, each having a pair of elongated mold faces arranged at right angles, the four quarters being arranged for fitting together in face to face contact for forming a complete closed, 360° mold; and one face of each mold having a row of spaced apart link cavities forming one-quarter of an oval shaped type link, that is, one-half of the oval and one-half of the thickness of the link, with the other face on the same mold quarter, similarly having a second row of similar link cavities, but offset longitudinally, to form the interengaging links, with the two rows thereby being generally arranged in perpendicular planes so that when the four mold quarters are closed, their cavities are aligned for simultaneously molding two interengaged generally perpendicularly related rows of links comprising a length of link chain; the improvement comprising:

alternate pairs of links in one row having their adjacent ends closely spaced together at the center of the interconnecting link of the other row, and a molten plastic feed channel extending through at least one of the mold quarters into that space and connected to said link ends and said link center by a narrowed feed neck, wherein molten plastic may be forced through the feed channels, through the feed necks and into the link cavities to mold the link chain, and upon cooling of the mold and opening of the mold quarters, the molded link chain may be manually physically pulled out of the cavities;

said feed necks being sufficiently narrowed in cross-section and of sufficient short length so that the solidified plastic therein is weakened to the point where the molded neck portions automatically break upon application of the force of manually physically pulling one end of the molded chain for removal from the mold, so that such a pull upon said one end of the molded chain automatically simultaneously breaks the feed necks to both disengage the links from the feed portions and release the links relative to each other for thereby forming a normal loose chain link interengagement.

References Cited

UNITED STATES PATENTS

| | | | |
|---|---|---|---|
| 2,217,661 | 10/1940 | Anderson | 18—30X |
| 3,469,284 | 9/1969 | Ross | 18—42X |
| 3,490,100 | 1/1970 | Funke | 18—42X |

H. A. KILBY, Jr., Primary Examiner

U.S. Cl. X.R.

249—57